G. G. LARKIN.

Thill-Coupling.

No. 6,450. Reissued May 25, 1875.

Witnesses:-
Frank H. Jordan
Edgar S. Brown

Inventor:-
George G. Larkin
per Wm. Henry Clifford
atty.

THE GRAPHIC CO. PHOTO-LITH. 39 & 41 PARK PLACE, N.Y.

UNITED STATES PATENT OFFICE.

GEORGE G. LARKIN, OF EXETER, NEW HAMPSHIRE.

IMPROVEMENT IN THILL-COUPLINGS.

Specification forming part of Letters Patent No. 82,420, dated September 22, 1868; reissue No. 6,450, dated May 25, 1875; application filed April 3, 1875.

*To all whom it may concern:*

Be it known that I, GEORGE G. LARKIN, of Exeter, in the county of Rockingham and State of New Hampshire, have invented certain new and useful Improvements in Carriage-Shackles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
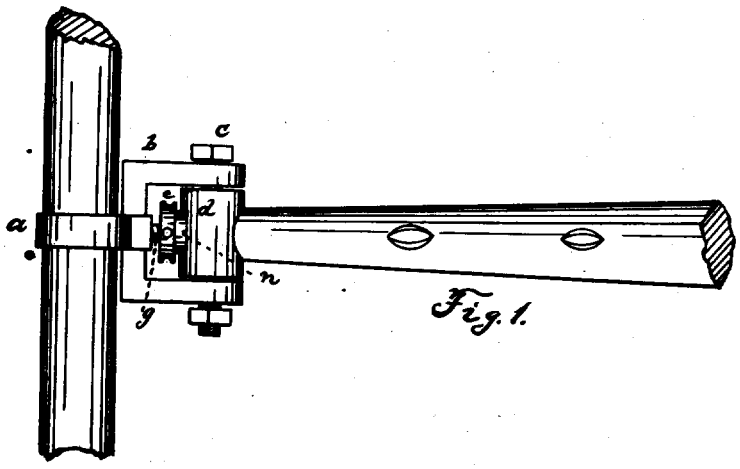
Figure 2:
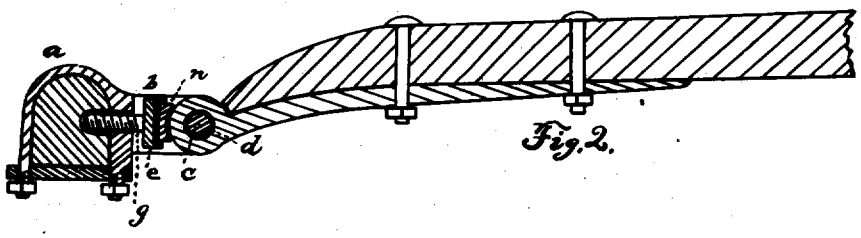

Figure 1 is a top plan. Fig. 2 is a longitudinal section.

Same letters show like parts.

The object of this invention is to prevent the rattling and consequent increased wear of the shackles of a carriage shaft or tongue. It consists of a disk formed with a screw-threaded shank, which disk is made to impinge against the rear of the eye of the shaft-iron, or any intermediate substance, and thereby keep it pressed firmly against the shackle-bolt, by which the rattling before referred to is prevented.

In the accompanying drawings the clip is shown at *a*, and is applied to the axle-tree in the ordinary manner. The shackle *b* is also as common, and the bolt *c* passes through the two arms of the shackle, and through the eye *d* of the shaft or tongue, as shown in the drawing.

The plate or disk *e* is placed behind the part of the shaft-iron which has the eye, and this disk is provided with a screw-shank, *g*, which screw-shank works in a hollow thread cut into the clip. By rotating the disk *e* in one direction, it may be made to press with any desired degree of force against the rear of the shaft-iron having the eye, or against any intermediate substance there may be, and so prevent noise and rattling when the carriage is in use; and by rotating it in an opposite direction, it may be made to retire away from contact with the shaft-iron.

My invention also consists of the combination of the disk with a pad or cushion, *n*, if desired. Radial holes, slots, or sockets may be made in the edge of the disk, for the purpose of inserting a rod or key, in order to adjust the disk against the iron having the eye, or the intermediate substance, with the desired pressure; but the disk, it is evident, may be operated practically by hand. The disk, in practice, would be of wrought or malleable iron; or the shank and disk may be formed of malleable iron or composition wholly. This disk can be applied to carriage-shackles of the pattern now in use, and will accomplish considerable saving in the wear of the same, and also prevent the clattering of the eye and the shackle-bolt.

What I claim as my invention, and desire to secure by Letters Patent, is—

1. The combination, with a carriage-shackle, of the disk *e*, formed with a screw-threaded shank, *g*, working in the front of the clip *a*, and against the rear of the eye of the shaft-iron, or other intervening substance, substantially as and for the purposes described.

2. The combination, with a carriage-shackle, of the disk *e*, having the shank *g*, arranged and operating as described, and a pad or cushion, *n*, as herein set forth.

In testimony that I claim the foregoing I have hereunto set my hand.

GEORGE G. LARKIN.

Witnesses:

WILLIAM H. LITTLE,

WILLIAM P. MOULTON.